United States Patent
Wang et al.

(10) Patent No.: US 11,105,758 B2
(45) Date of Patent: Aug. 31, 2021

(54) PREDICTION METHOD FOR MOLD BREAKOUT BASED ON FEATURE VECTORS AND HIERARCHICAL CLUSTERING

(71) Applicant: DALIAN UNIVERSITY OF TECHNOLOGY, Liaoning (CN)

(72) Inventors: Xudong Wang, Liaoning (CN); Haiyang Duan, Liaoning (CN); Man Yao, Liaoning (CN)

(73) Assignee: Dalian University of Technology, Liaoning (CN)

( * ) Notice: Subject to any disclaimer, the term of this patent is extended or adjusted under 35 U.S.C. 154(b) by 0 days.

(21) Appl. No.: 16/761,474

(22) PCT Filed: Aug. 12, 2019

(86) PCT No.: PCT/CN2019/100130
§ 371 (c)(1),
(2) Date: May 4, 2020

(87) PCT Pub. No.: WO2020/119156
PCT Pub. Date: Jun. 18, 2020

(65) Prior Publication Data
US 2021/0048402 A1    Feb. 18, 2021

(30) Foreign Application Priority Data

Dec. 11, 2018   (CN) .......................... 201811507030.6

(51) Int. Cl.
*G01N 25/72*    (2006.01)
*B22D 11/16*    (2006.01)
(Continued)

(52) U.S. Cl.
CPC .......... *G01N 25/72* (2013.01); *B22D 11/051* (2013.01); *B22D 11/16* (2013.01); *B22D 11/166* (2013.01);
(Continued)

(58) Field of Classification Search
CPC ...... G01N 25/72; B22D 11/166; B22D 46/00; B22D 11/16; B22D 11/04; B22D 11/051;
(Continued)

(56) References Cited

FOREIGN PATENT DOCUMENTS

| CN | 101367114 A | 2/2009 |
|---|---|---|
| CN | 101850410 A | 10/2010 |

(Continued)

OTHER PUBLICATIONS

International Search Report and Written Opinion Based on Application No. PCT/CN2019/100130; dated Nov. 5, 2019.

*Primary Examiner* — Daniel R Miller
*Assistant Examiner* — Christian T Bryant
(74) *Attorney, Agent, or Firm* — Muncy, Geissler, Olds & Lowe, P.C.

(57) ABSTRACT

A prediction method for mold breakout based on feature vectors and hierarchical clustering is disclosed, which comprises: respectively extracting temperature feature vectors of historical data under sticking breakout and normal conditions and on-line actually measured data to establish a feature vector sample set; performing normalization and hierarchical clustering on the sample set; and checking and judging whether the feature vectors extracted on line belong to a breakout cluster, and then identifying and predicting mold breakout. The method avoids the steps of tedious adjustment and modification of alarm threshold and other parameters, overcomes the artificial dependence of the previous breakout prediction method, has good robustness and mobility; and through temperature feature extraction,
(Continued)

achieves accurate identification of sticking breakout temperature patterns, avoids missing alarms and significantly reduces the number of times of false alarms, and greatly reduces the data calculation amount and calculation time, guaranteeing the timeliness of on-line prediction.

2 Claims, 6 Drawing Sheets

(51) Int. Cl.
*G06F 17/18* (2006.01)
*G06N 20/00* (2019.01)
*B22D 11/18* (2006.01)
*G06F 30/00* (2020.01)
*B22D 11/051* (2006.01)
*G06K 9/62* (2006.01)
*B22D 46/00* (2006.01)
*G06K 9/46* (2006.01)

(52) U.S. Cl.
CPC .............. *B22D 11/18* (2013.01); *B22D 46/00* (2013.01); *G06F 17/18* (2013.01); *G06F 30/00* (2020.01); *G06K 9/46* (2013.01); *G06K 9/6219* (2013.01); *G06N 20/00* (2019.01)

(58) Field of Classification Search
CPC ......... B22D 11/18; G06F 17/18; G06F 30/00; G06N 20/00; G06K 9/46; G06K 9/6219
See application file for complete search history.

(56) References Cited

FOREIGN PATENT DOCUMENTS

| | | | |
|---|---|---|---|
| CN | 101477374 B | * | 11/2011 |
| CN | 107096899 A | | 8/2017 |
| CN | 108097905 A | | 6/2018 |
| CN | 108436050 A | | 8/2018 |
| CN | 108580827 A | | 9/2018 |
| CN | 108705058 A | * | 10/2018 |
| CN | 109396375 A | | 3/2019 |
| JP | 2001287001 A | * | 10/2001 |
| JP | 2003266161 A | * | 9/2003 |
| JP | 4112783 B2 | | 7/2008 |
| JP | 2012139713 A | * | 7/2012 |
| WO | WO-2009/107865 A1 | | 9/2009 |

* cited by examiner

PREDICTION METHOD FOR MOLD BREAKOUT BASED ON FEATURE VECTORS AND HIERARCHICAL CLUSTERING

TECHNICAL FIELD

The present invention belongs to the technical field of continuous casting detection of iron and steel metallurgy, and relates to a prediction method for mold breakout based on feature vectors and hierarchical clustering.

BACKGROUND

Sticking breakout refers that in the continuous casting process, the thinner initial solidification shell near the meniscus fractures, molten steel comes into contact with the mold copperplate and sticks to same after leakage, as the mold oscillates and the strand moves downward, sticking repeatedly tears-heals and moves downwards, and loses the support and restraint of the copperplate after moving out of the mold outlet, and the molten steel overflows, causing breakout. Breakout not only endangers the safety of on-site operators and severely damages continuous casting equipment, but also results in the forced interruption of continuous casting production, causing substantial rising of equipment maintenance and production costs. Therefore, performing on-line monitoring and prediction for breakout is always the top priority of continuous casting process control, and is of great significance to ensure the smooth production.

At present, the current breakout prediction method is mainly performed by embedding some temperature measuring thermocouples on the mold copperplates, and monitoring and judging whether a sticking occurs between the strand and the copperplate according to the change in the temperature of the thermocouple. Practice indicates that the rate of change in the thermocouple temperature over time when the sticking occurs and the amplitude are significantly different from that under normal conditions. Therefore, mold breakout can be predicted on line by extracting and generalizing the common features of the thermocouple temperature and the rate and amplitude, combining the logical judgement or neural network method, and distinguishing and identifying typical temperature features of sticking.

Judging, from the actual application of the existing breakout prediction technology, the breakout prediction method based on logical judgement has strong dependence on continuous casting equipment, process parameters and physical properties, and when the process is adjusted and the casting speed is increased, the threshold value changes greatly, resulting in a significant increase in the false alarm rate and the missing alarm rate; the neural network method has higher requirements on learning and training samples, when the samples are incomplete or invalid, the prediction effect may be seriously affected, and the mobility ability of the model is low. In practice, in order to avoid missing alarms as much as possible, a certain margin may be reserved when designing the prediction algorithm or setting the alarm threshold. In the case of process adjustment or equipment maintenance and replacement, the prediction threshold needs to be frequently adjusted and modified manually. If the prediction threshold is not set properly or adjusted in time, it is difficult to accurately identify and eliminate false alarms, and even causes false alarms, which is a common problem faced by current breakout prediction systems.

The patent CN106980729A discloses a prediction method for continuous casting breakout based on a hybrid model. The method comprises the following steps: collecting and storing real-time data of temperatures of all thermocouples on the spot; judging whether the change in the temperature of each thermocouple in the time series accords with a temperature change waveform during sticking breakout, saving the judging result as $Y(i, j, t)$; if $Y(i, j, t)$ is within a set threshold range, making the thermocouple to be abnormal, and counting the number of abnormal thermocouples at the row where the current thermocouple is located and at the previous row, and comparing the output total number of the abnormal thermocouples with the number threshold of sticking warning and sticking alarm thermocouples. The method focuses on the change in the temperature of a single thermocouple and the superposition number of abnormal thermocouples, but does not involve "time-lag" important for sticking breakout, making it difficult to accurately capture the "time-lag" and "temperature-inversion" features of breakout, thus affecting the prediction accuracy of the method.

The patent CN102554171A discloses a prediction method for continuous casting breakout. An adaptive algorithm is introduced into the BP neural network to achieve automatic optimization of the network structure, a friction monitoring and breakout prediction model based on logical judgement and neural network is proposed, the temperature monitoring accuracy is organically combined with the friction monitoring sensitivity, and a prediction mechanism mainly based on temperature monitoring and supplemented by friction monitoring is established. In the method, a temperature monitoring single-thermocouple alarm point, a pair-thermocouple alarm point, a friction logical judgement alarm point, and a sequential network alarm point are set, each alarm point is provided with three levels of yellow, orange and red, and corresponding thresholds are required to be set for all alarm points, so prediction parameters are numerous, so that the method has poor universality and mobility in breakout prediction.

The patent CN108580827A discloses a method for predicting mold breakout based on agglomerative hierarchical clustering, comprising the following steps: establishing a sticking breakout sample library and a normal condition sample library, randomly selecting the same amount of samples from the sticking breakout sample set and the normal condition sample set respectively, forming a random sample set by the selected samples together with on-line actually measured samples, performing hierarchical clustering on the random sample set, and then detecting whether the on-line actually measured temperature samples belong to a sticking breakout cluster, to identify and predict breakout. The invention gets rid of the dependence on artificially defined parameters in the prediction process, and only uses sticking breakout and normal condition temperature features to determine whether the on-line actually measured temperature samples belong to a sticking breakout cluster. However, the limitations of the method are: 1) some samples are randomly selected for clustering from all breakout sample sets, so it is impossible to take into account the common features of all samples and the personality features of single samples, that is, the sample features are not covered comprehensively after clustering; and 2) the temperature data is directly used for clustering after preprocessing, so both the amount of data and the amount of calculation are large, which affects the timeliness of on-line prediction. In view of the above problem, on the one hand, the present invention reduces the dimensionality and calculation amount of data by temperature feature extraction, and on the other hand, uses all samples including breakout samples and normal condition samples to perform hierarchical clustering so as to take into account the common features and personality features of the samples, and improves the on-line operation speed and timeliness on the premise of ensuring the accuracy of prediction

SUMMARY

To overcome the defects existing, in the existing prediction method in the aspect of breakout feature extraction, the present invention provides a prediction method for mold breakout based on feature vectors and hierarchical clustering, comprising: extracting the temperature feature vectors of all sticking breakout samples, historical data under normal conditions, and on-line actually measured data to establish a feature vector library; performing normalization and hierarchical clustering on the feature vector library; and checking and judging whether the feature vectors extracted on line belong to a breakout cluster, and then identifying and predicting mold breakout.

To achieve the above purpose, the present invention adopts the following technical solution:

A prediction method for mold breakout based on feature vectors and hierarchical clustering, comprising the following steps:

First Step: Extracting Sticking Breakout Feature Vectors (1) acquiring historical temperature data of sticking breakout: marking the time when the temperature of the first row of thermocouples in the thermocouple column where the sticking position is located is the maximum, and selecting the temperature data within the first M seconds and the last N−1 seconds, M+N seconds in total;

(2) extracting and constructing temperature feature vectors of the first and second rows of thermocouples: extracting features of change in the temperature of the same column of thermocouples in the casting direction during sticking breakout by using each column of thermocouples as a unit, specifically including:

1st_Rising_Amplitude: first row temperature rising amplitude;

1st_Rising_V_Max: first row temperature rising velocity maximum;

1st_Falling_V_Ave: first row temperature falling velocity average;

2nd_Rising_V_Max: second row temperature rising velocity maximum;

1st_2nd_Time_Lag: temperature rising time lag, that is, time interval between the time when the temperature of the second row of thermocouple starts to rise and the time when the temperature of the first row of thermocouple starts to rise;

and thus constructing a feature vector:

s=[1st_Rising_Amplitude, 1st_Rising_V_Max, 1st_Falling_V_Ave, 2nd_Rising_V_Max, 1st_2nd_Time_Lag]

Second Step: Extracting Normal Condition Feature Vectors (1) acquiring historical temperature data under normal conditions: randomly intercepting temperature data at continuous M+N seconds; extracting and constructing temperature feature vectors of the first and second rows of thermocouples: extracting features of change in the temperature of the same column of thermocouples in the casting direction under normal conditions by using each column of thermocouples as a unit, the specific method being the same as that in the first step (2);

Third Step: Extracting On-Line Real-Time Temperature Feature (1) collecting and acquiring temperature data of thermocouples of each row and each column on loosed wide face, fixed wide face, left narrow face, and right narrow face copperplates of the mold with the current time and previous M+N−1 seconds, M+N seconds in total in real time;

(2) extracting and constructing temperature feature vectors of the first and second rows of thermocouples: extracting features of change in the temperature of the same column of thermocouples in the casting direction at on-line real-time temperature by using each column of thermocouples as a unit, the specific method being the same as that in the first step (2);

Fourth Step: Establishing Feature Vector Library (1) establishing a feature vector sample library D based on the sticking breakout, normal condition and on-line actually measured temperature feature extracted in the first step, the second step and the third step;

(2) performing normalization on the feature vector sample library D, to obtain a feature vector set S, and recording a normalized on-line actually measured temperature feature as $s_{new}$, the specific normalization method being as follows:

$$x\_nor_{ij} = \frac{x_{ij} - x_{jmin}}{x_{jmax} - x_{jmin}}, i = 1, 2, \ldots, |S|, j = 1, 2, \ldots, 5$$

where $x_{ij}$ represents the value of the j-dimensional feature of the $i^{th}$ feature vector in the feature vector set S, $x_{jmax}$, and $x_{jmin}$ respectively represent a maximum and a minimum of the j-dimensional feature of all feature vectors, and |S| represents the total number of vectors in the feature vector set S.

Fifth Step: Performing Hierarchical Clustering on Feature Vectors (1) performing hierarchical clustering on the feature vector set S obtained in the fourth step, the specific process including:

1.1) taking each vector s in the feature vector set S as an initial cluster $C_i=\{s_i\}$, and establishing a cluster set $C=\{C_1 C_2, \ldots, C_k\}$, where $s_i$ represents the $i^{th}$ vector in S, $C_i$ represents the $i^{th}$ cluster, i=1, 2, ..., k, k represents the total number of vectors in the feature vector set S;

1.2) calculating and determining the distance between any two clusters $C_p$ and $C_q$ in the cluster set C:

$$d(C_p, C_q) = \min(\text{dist}(C_{pi}, C_{qj}))$$

where $C_{pi}$ represents the $i^{th}$ feature vector in the cluster $C_p$, $C_{qj}$ represents the $j^{th}$ feature vector in the cluster $C_q$, and $\text{dist}(C_{pi}, C_{qj})$ represents the Euclidean distance between the feature vectors $C_{pi}$ and $C_{qj}$; and calculating the distance between any two vectors in the clusters $C_p$ and $C_q$, and taking the minimum distance min as the distance between the clusters $C_p$ and $C_q$;

1.3) marking the two clusters $C_m$ and $C_n$ between which the distance is the minimum calculated in the step 1.2), merging $C_m$ and $C_n$ into a new cluster $C_{\{m,n\}}$ and adding same to the set C, and deleting the original clusters $C_m$ and $C_n$, so after cluster addition and deletion, the total number of clusters in the set C is reduced by one at this time;

1.4) performing steps 1.2)-1.3) in a loop, when there are only two clusters in the cluster set C, ending the loop, and completing the clustering process;

(2) checking whether the clustering result meets the following judgement condition, that is:

more than 90% of all sticking breakout feature vectors belong to the same cluster, and the percentage of the normal condition feature vectors in the cluster is less than 20%;

if this condition is met, recording this cluster as a breakout cluster $C_{breakout}$, and recording the other cluster as a normal condition cluster $C_{normal}$; otherwise, performing steps (1) and (2) again until the clustering result of the feature vector set composed of breakout, normal condition, and actually measured temperature feature meets the above judgement condition;

Sixth Step: Identifying Breakout and Issuing Alarm judging whether the new feature vector $s_{new}$ belongs to the cluster $C_{breakout}$, if so, issuing a breakout alarm; otherwise, continuing to perform the third steps, the fourth step, the fifth step and the sixth step.

The breakout prediction method is suitable for identifying breakout of continuous casting slabs such as slabs, billets, round billets, beam blanks, etc.

The present invention has the advantageous effects that: the proposed prediction method for mold breakout based on feature vectors and hierarchical clustering avoids the steps of tedious adjustment and modification of alarm threshold and other parameters, overcomes the artificial dependence of the previous breakout prediction method, has good robustness and mobility; and through temperature feature extraction, achieves accurate identification of sticking breakout temperature patterns, avoids missing alarms and significantly reduces the number of times of false alarms, and greatly reduces the data calculation amount and calculation time, guaranteeing the timeliness of on-line prediction.

DETAILED DESCRIPTION

The present invention will be further illustrated below through specific embodiments in combination with drawings.

The present invention mainly comprises six parts: extracting sticking breakout feature vectors, extracting normal condition feature vectors, extracting on-line real-time temperature feature vectors, establishing feature vector library, performing hierarchical clustering on feature vectors, and identifying breakout and issuing alarm.

Figure 1:
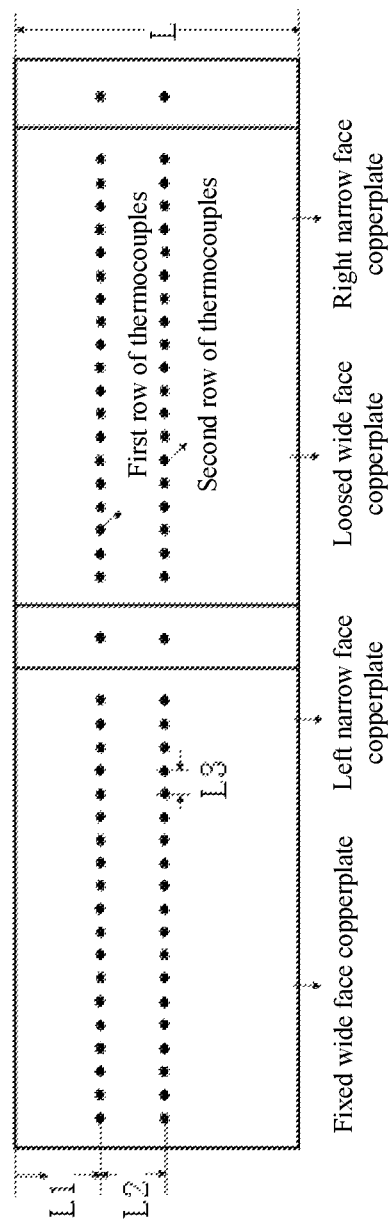
FIG. 1 is a schematic diagram showing distribution of four mold copperplates and thermocouples.

FIG. 1 is a schematic diagram showing distribution of four mold copperplates and thermocouples. A slab continuous casting mold is composed of four copperplates, including a fixed wide face copperplate, a left narrow face copperplate, a loosed wide face copperplate and a right narrow face copperplate respectively having a length L of 900 mm, two rows of measuring points are arranged on the horizontal cross-section of the four copperplates L1 (210 mm) and L2 (325 mm) away from the upper opening of the mold, 19 columns of thermocouples are arranged in each row on the fixed wide face copperplate and the loosed wide face copperplate, with the distance L3 between two thermocouples is 150 mm, and each of the two wide face copperplates is provided with 38 thermocouples; each of the left narrow face copperplate and the right narrow face copperplate is provided with a column of thermocouples at the centerline, and each of the narrow face copperplates is provided with 2 thermocouples. The four copperplates are provided with 80 thermocouples in total, and the distances from all thermocouples to the mold copperplate hot face are equal.

First Step: Extracting Sticking Breakout Feature Vectors (1) acquiring historical temperature data of sticking breakout: marking the time when the temperature of the first row of thermocouples in the thermocouple column where the sticking position is located is the maximum, and selecting the temperature data within the first 15 seconds and the last 9 seconds, 25 seconds in total; and for the historical temperature of sticking breakout, selecting 30 temperature samples;

(2) extracting and constructing temperature feature vectors of the first and second rows of thermocouples.

Figure 2:
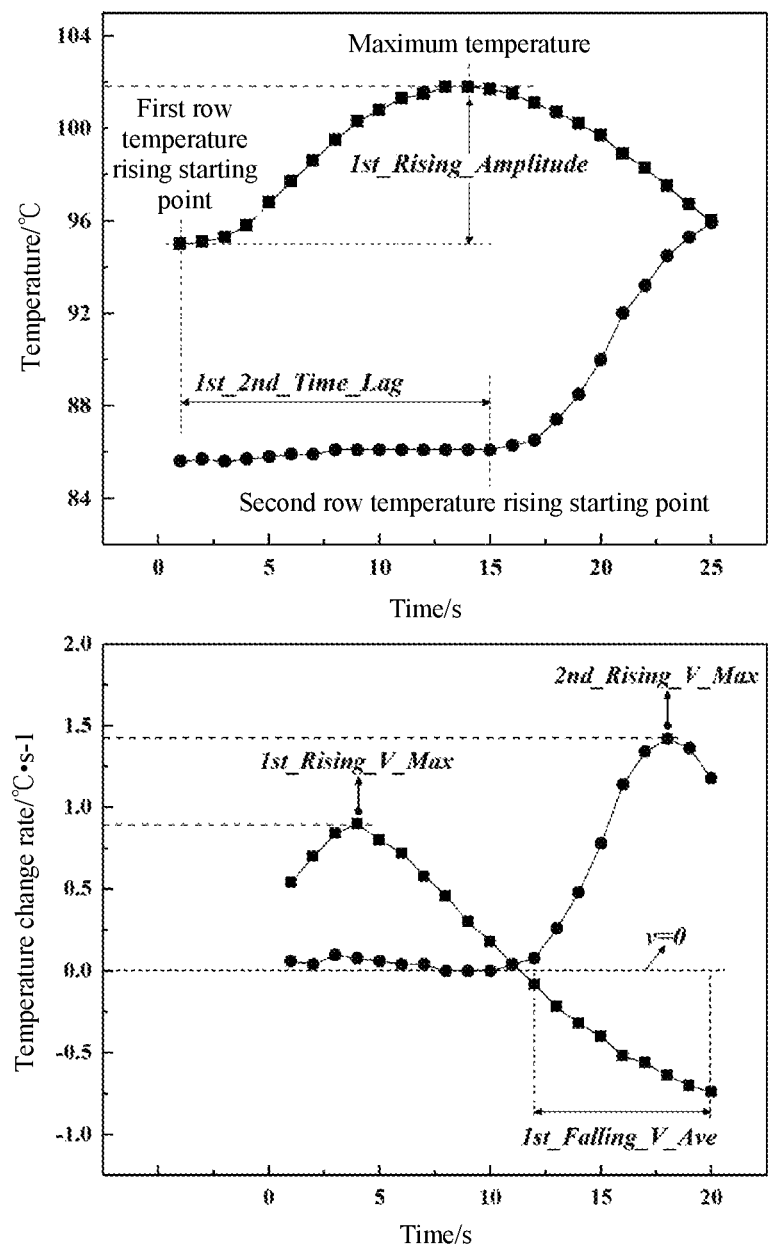
FIG. 2 is a schematic diagram showing extraction of feature vectors of temperature and change rate thereof during sticking breakout.

FIG. 2 is a schematic diagram showing extraction of feature vectors of sticking breakout temperature and temperature change rate. As shown in FIG. 2, in feature vector extraction, the features of change in the temperature of the same column of thermocouples in the casting direction during sticking breakout are extracted respectively by taking each column of thermocouples as a unit, the specific features and extraction method therefor being as follows:

2.1) Calculating the change rate of temperature data within 5 seconds at the same measuring point, that is:

$$v_{(r)i} = \frac{T_{(r)i+5} - T_{(r)i}}{5}, i \in [1, 2, \ldots, 20]$$

where $r \in [1,2]$ respectively represents the first and second rows of thermocouples, $T_{(r)i}$ represents a temperature value of the $r^{th}$ row of thermocouples at the $i^{th}$ time, and $v_{(r)i}$ represents the value of the temperature change rate of the $r^{th}$ row of thermocouples at the $i^{th}$ time.

2.2) Determining the starting temperature and time corresponding thereto when the temperature rises:

firstly, acquiring the maximum temperature $T_{max}$ within 25 seconds in total including the current time and the previous time, and time $t_{max}$ corresponding thereto, that is:

$$T_{max} = \max(T_i), i=1,2,\ldots,25,$$

secondly, traversing forward from $T_{max}$, acquiring the previous minimum temperature $T_{min}$ and time $t_{min}$ thereof, that is, $$T_{min} = \min(T_i), i=1,2,\ldots,t_{max}$$

taking $T_{min}$ as the starting temperature when the temperature rises, and recording the time corresponding thereto as $t_{min}$.

2.3) Extracting corresponding features to construct a feature vector:

1st_Rising_Amplitude: first row temperature rising amplitude, that is, respectively marking the rising temperature of the first row of thermocouples and the maximum temperature, calculating the difference between the two temperatures, and obtaining a temperature rising amplitude, in □;

$$1st\_Rising\_Amplitude = T_{(1)max} - T_{(1)min}$$

1st_Rising_V_Max: first row temperature rising velocity maximum, that is, extracting the maximum temperature change velocity of the first row of thermocouples obtained in step 2.1), in □/s;

$$1st\_Rising\_V\_Max = \max(v_{(1)})$$

1st Falling_V_Ave: first row temperature falling velocity average, that is, calculating the average temperature velocity of the first row of thermocouples whose temperature change velocity is less than 0 obtained in the step 2.1), in □/s;

$$1st\_Falling\_V\_Ave = \underset{v_{(1)i}<0}{\text{Average}}(v_{(1)i}), i \in [1, 2, \ldots, 20]$$

2nd_Rising_V_Max: second row temperature rising velocity maximum, that is, extracting the maximum temperature change velocity of the second row of thermocouples obtained in the step 2.1), in □/s;

$$2nd\_Rising\_V\_Max = \max(v_{(2)})$$

1st_2nd_Time_Lag: temperature rising time lag, that is, respectively marking the times corresponding to the time when the temperature of the second row of thermocouples starts to rise and the time when the temperature of the first row of thermocouples starts to rise, and taking the time interval between the two as the temperature rising time lag, in s;

$$1st\_2nd\_Time\_Lag = t_{(2)min} - t_{(1)min}$$

and thus constructing a feature vector:

s=[1st_Rising_Amplitude, 1st_Rising_V_Max, 1st_Falling_V_Ave, 2nd_Rising_V_Max, 1st_2nd_Time_Lag]

Second Step: Extracting Normal Condition Feature Vectors (1) acquiring historical temperature data under normal conditions: randomly intercepting temperature data within continuous 25 seconds;

(2) extracting and constructing temperature feature vectors of the first and second rows of thermocouples.

Figure 3:
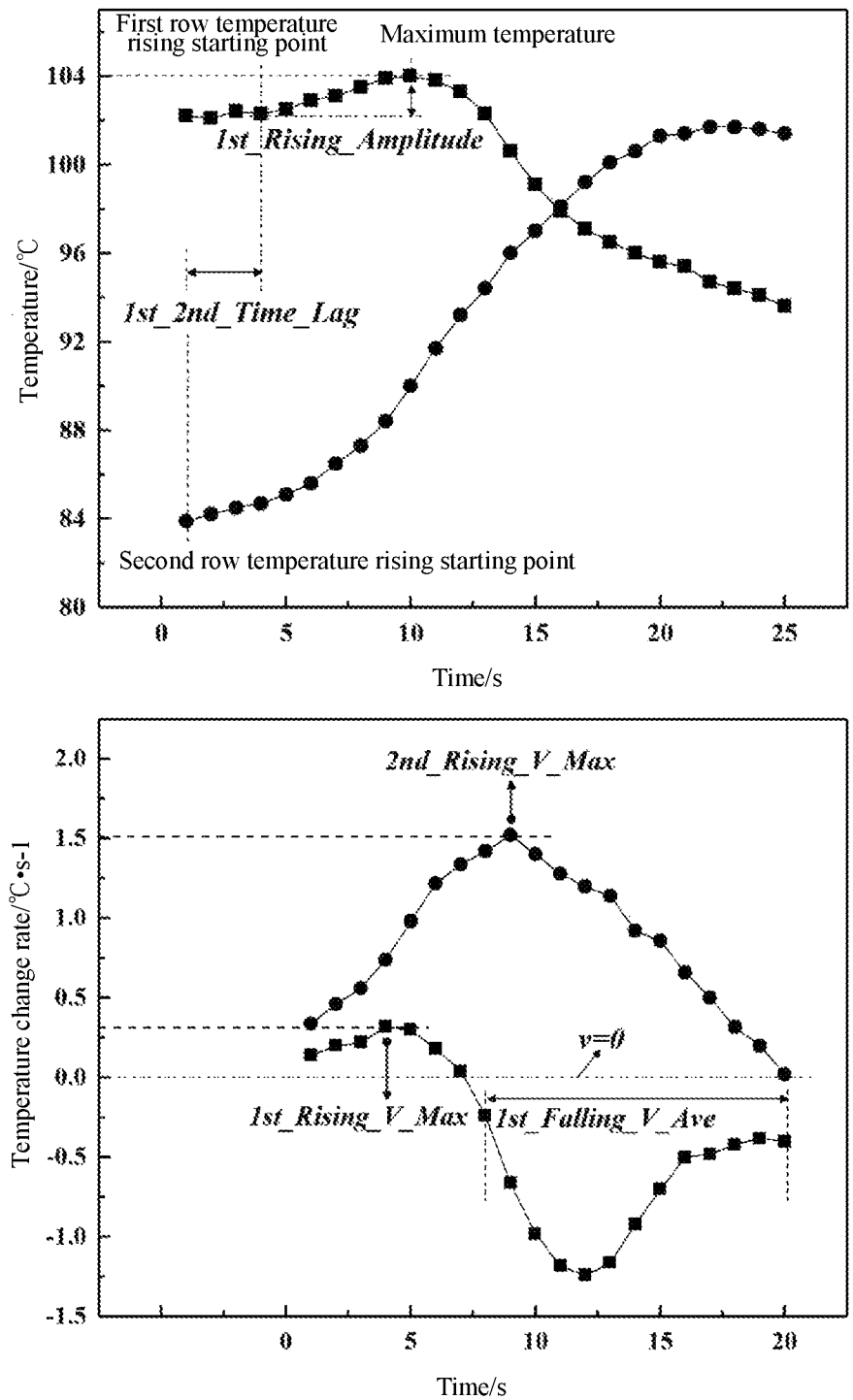
FIG. 3 is a schematic diagram showing extraction of feature vectors of temperature and change rate thereof under normal conditions.

FIG. 3 is a schematic diagram showing extraction of feature vectors of temperature and temperature change rate under normal conditions. As shown in FIG. 3, in feature vector extraction, the features of change in the temperature of the same column of thermocouples in the casting direction under normal conditions are extracted respectively by taking each column of thermocouples as a unit, the features and extraction method therefor being the same as that in the first step (2).

For the normal condition temperature, 30 temperature samples are selected.

Figure 4:
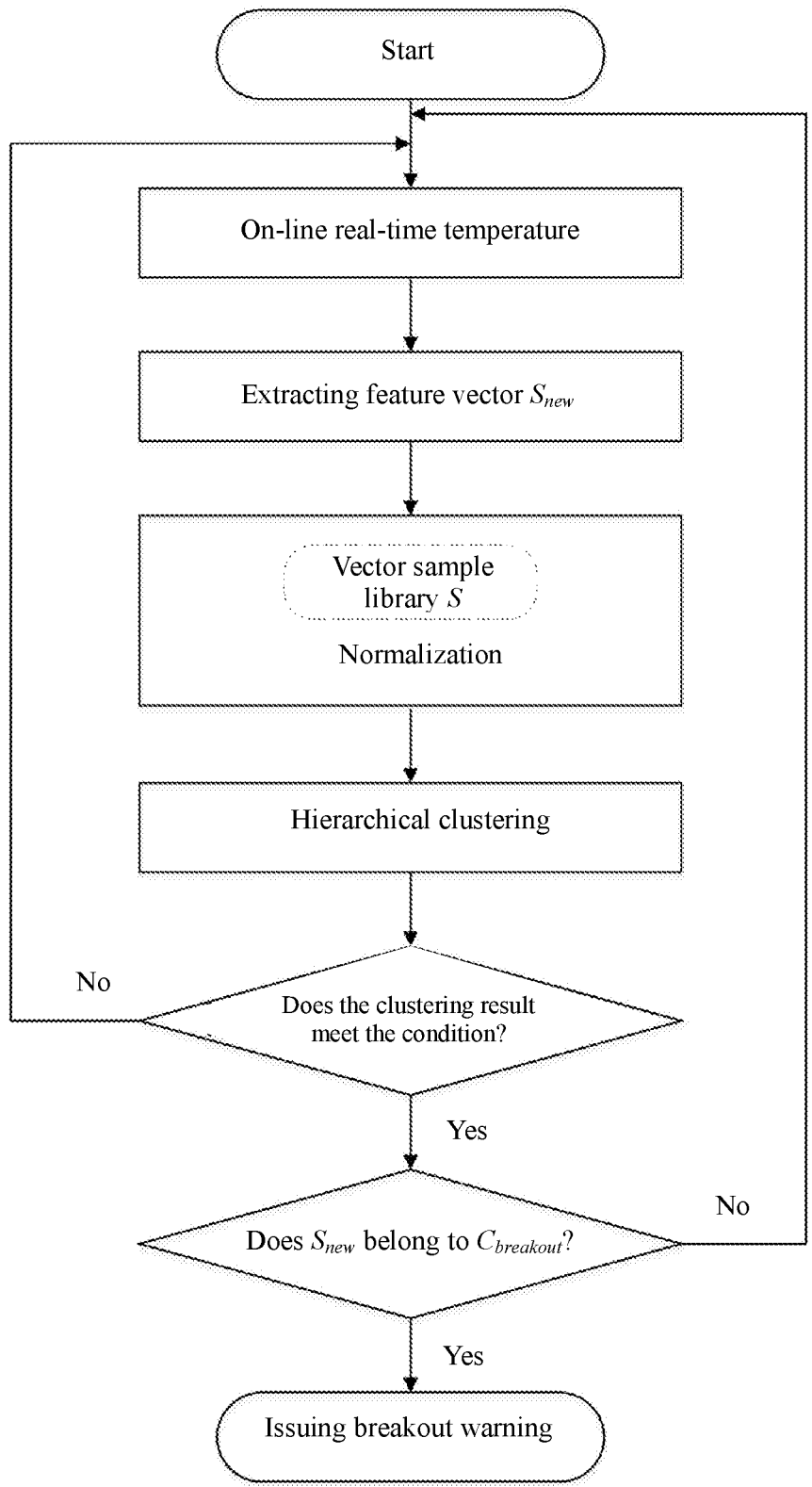
FIG. 4 is a flow chart showing hierarchical clustering of a feature vector set and breakout identification and warning.

FIG. 4 is a flow chart showing hierarchical clustering of a feature vector set and breakout identification and determination. As shown in the figure, hierarchical clustering of a feature vector set and breakout identification and determination mainly include the following steps:

Third Step: Extracting On-Line Real-Time Temperature Feature Vectors (1) collecting and acquiring temperature data of thermocouples of each row and each column on loosed wide face, fixed wide face, left narrow face, and right narrow face copperplates of the mold within the current time and previous 24 seconds, 25 seconds in total in real time;

(2) extracting and constructing temperature feature vectors of the first and second rows of thermocouples:

in feature vectors extraction, the features of change in the temperature of the same column of thermocouples in the casting direction during on-line actual measurement are extracted respectively by taking each column of thermocouples as a unit, the features and extraction method therefor being the same as that in the first step (2).

Fourth Step: Establishing Feature Vector Library (1) establishing a feature vector sample library D based on the sticking breakout, normal condition and on-line actually measured temperature feature extracted in the first step, the second step and the third step, 61 in total;

(2) performing normalization on the feature vector sample library D, to obtain a feature vector set S, and recording a normalized on-line actually measured temperature feature as $s_{new}$. The specific normalization method is as follows:

$$x\_nor_{ij} = \frac{x_{ij} - x_{jmin}}{x_{jmax} - x_{jmin}}, i = 1, 2, \ldots, 61, j = 1, 2, \ldots, 5$$

where $x_{ij}$ represents the value of the j-dimensional feature of the $i^{th}$ feature vector in the feature vector set S, and $x_{jmax}$ and $x_{jmin}$ respectively represent a maximum and a minimum of the j-dimensional feature of all the 61 feature vectors.

Fifth Step: Performing Hierarchical Clustering on Feature Vectors (1) performing hierarchical clustering on the feature vector set S obtained in the fourth step;

1.1) taking each vector s in the feature vector set S as an initial cluster $C_i = \{s_i\}$, and establishing a cluster set $C = \{(C_1, C_2, \ldots, C_k\}$, $s_i$ represents the $i^{th}$ vector in S, and $C_i$ represents the $i^{th}$ cluster, i=1,2, . . . , 61;

1.2) calculating and determining the distance between any two clusters $C_p$ and $C_q$ in the cluster set C:

$$d(C_p, C_q) = \min(\text{dist}(C_{pi}, C_{qj}))$$

where $C_{pi}$ represents the $i^{th}$ feature vector in the cluster $C_p$, $C_{qj}$ represents the $j^{th}$ feature vector in the cluster $C_q$, and $\text{dist}(C_{pi}, C_{qj})$ represents the Euclidean distance between the feature vectors $C_{pi}$ and $C_{qj}$; and calculating the distance between any two vectors in the clusters $C_p$ and $C_q$, and taking the minimum distance min as the distance between the clusters $C_p$ and $C_q$;

1.3) marking the two clusters $C_m$ and $C_n$ between which the distance is the minimum calculated in the step 1.2), merging $C_m$ and $C_n$ into a new cluster $C_{\{m,n\}}$ and adding same to the set C, and deleting the original clusters $C_m$ and $C_n$, so after cluster addition and deletion, the total number of clusters in the set C is reduced by one at this time;

1.4) performing steps 1.2)-1.3) in a loop, when there are only two clusters in the cluster set C, ending the loop, and completing the clustering process;

(2) checking whether the clustering result meets the following judgement condition, that is:

more than 90% of all sticking breakout feature vectors belong to the same cluster, and the percentage of the normal condition feature vectors in the cluster is less than 20%;

if this condition is met, recording this cluster as a breakout $C_{breakout}$, and recording the other cluster as a normal condition cluster $C_{normal}$; otherwise, performing steps (1) and (2) again until the clustering result of the feature vector set composed of breakout, normal condition, and actually measured temperature feature meets the above judgement condition;

Sixth Step: Identifying Breakout and Issuing Alarm judging whether the new feature vector $s_{new}$ belongs to the cluster $C_{breakout}$, if so, issuing a breakout alarm; otherwise, continuing to perform the third steps, the fourth step, the fifth step and the sixth step.

Figure 5:
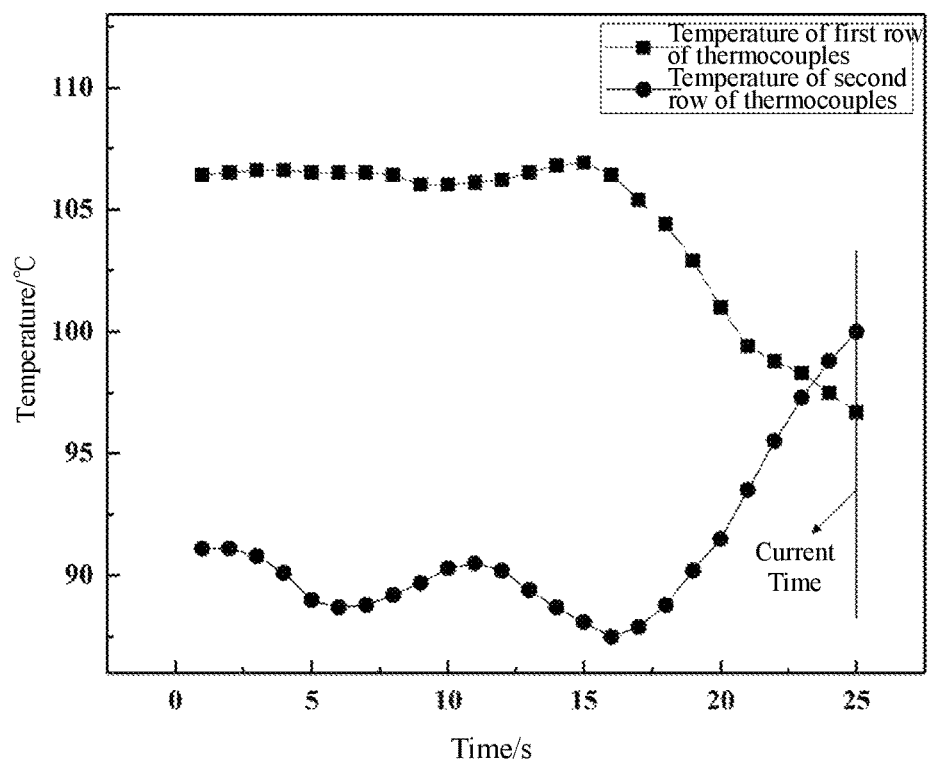
FIG. 5 shows on-line actually measured temperature 1.

FIG. 5 is a diagram showing temperature of the first and second rows of thermocouples that represents the on-line actually measured temperature 1. The right vertical line in the figure represents temperature data within 25 seconds in total including the current time when on-line detection is performed, and the 24 times before that time. The feature vector obtained after performing feature extraction on the on-line temperature 1 is:

$$s_{new}=[0.4,0.18,-1.18,1.72,0].$$

Figure 6:
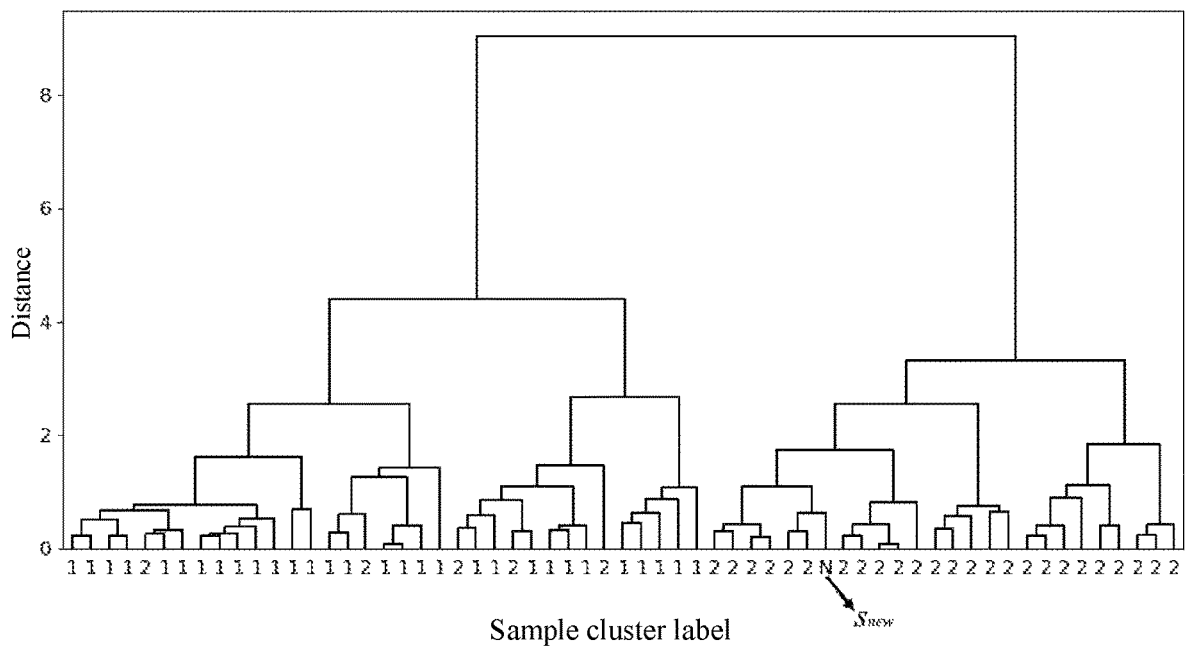
FIG. 6 shows a hierarchical clustering and breakout prediction result containing an on-line actually measured temperature feature vector 1.

FIG. 6 is a diagram showing a hierarchical clustering and breakout prediction result of a feature vector set containing an on-line actually measured temperature feature vector 1, that is, containing $s_{new}$. As shown in the figure, after normalization and hierarchical clustering, the feature vector set is clustered into two clusters: the left cluster includes all the sticking breakout feature vectors labeled 1 and five normal condition samples labeled 2, the percentage of sticking breakout feature vectors in this cluster is greater than 90% of the total number of sticking breakout samples, and the percentage of normal condition feature vectors is less than 20% of the total number of normal condition samples, that is, six feature vectors, the cluster judgement condition is met, the hierarchical clustering of feature vectors is successful, so the cluster is recorded as a breakout cluster $C_{breakout}$; and then the other cluster including more normal condition samples labeled 2 is recorded as a normal condition cluster $C_{normal}$. As shown in FIG. 6, the feature vector $s_{new}$ obtained by performing feature extraction on the on-line actually measured temperature 1, that is, the sample labeled "N", belongs to the normal condition cluster $C_{normal}$ after clustering, but does not belong to the sticking breakout cluster $C_{breakout}$. Therefore, it is judged as normal condition, the temperature sequence is updated continuously, and the third steps, the fourth step, the fifth step and the sixth step are performed.

Figure 7:
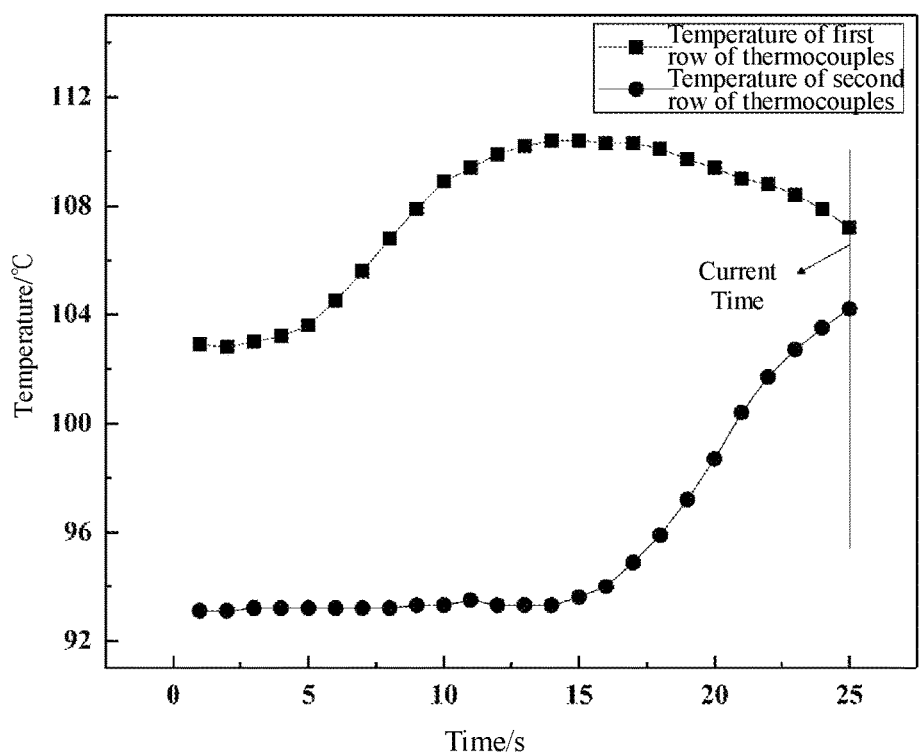
FIG. 7 shows on-line actually measured temperature 2.

FIG. 7 is a diagram showing the temperature of the first and second rows of thermocouples that represents the on-line actually measured temperature 2. The right vertical line in the figure represents temperature data within 25 seconds in total including the current time when on-line detection is performed, and the 24 times before that time. The feature vector obtained after performing feature extraction on the on-line temperature 2 is:

$$s_{new}=[7.4,1.06,-0.29,1.36,12].$$

Figure 8:
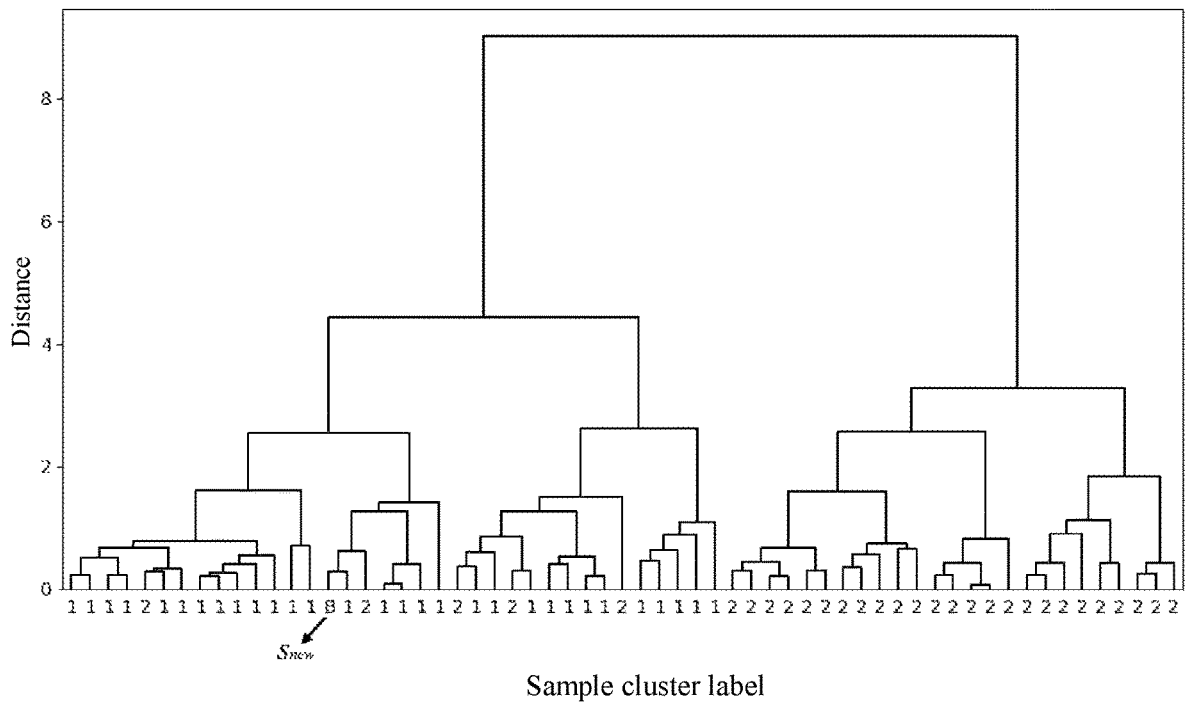
FIG. 8 shows a hierarchical clustering and breakout prediction result containing an on-line actually measured temperature feature vector 2.

FIG. 8 is a diagram showing a hierarchical clustering and breakout prediction result of a feature vector set containing an on-line actually measured temperature feature vector 2, that is, containing $s_{new}$. As shown in the figure, after normalization and hierarchical clustering, the feature vector set is clustered into two clusters: the left cluster includes all the sticking breakout samples labeled 1 and five normal condition samples labeled 2, the percentage of sticking breakout feature vectors in this cluster is greater than 90% of the total number of sticking breakout samples, and the percentage of normal condition feature vectors is less than 20% of the total number of normal condition samples, that is, six feature vectors, the cluster judgement condition is met, the hierarchical clustering of feature vectors is successful, so the cluster is recorded as a breakout cluster $C_{breakout}$; and then the other cluster including more normal condition samples labeled 2 is recorded as a normal condition cluster $C_{normal}$. As shown in FIG. 8, the feature vector $s_{new}$ obtained by performing feature extraction on the on-line actually measured temperature 2, that is, the sample labeled "B", belongs to the sticking breakout cluster $C_{breakout}$ after clustering. Therefore, it is judged as breakout, a breakout alarm is issued.

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. A prediction method for mold breakout based on feature vectors and hierarchical clustering comprising the following parts: respectively extracting temperature feature vectors of historical data of sticking breakout and normal conditions and on-line actually measured data, and establishing a feature vector sample set; performing normalization and hierarchical clustering on the sample set; and checking and judging whether the feature vectors extracted on line belong to a breakout cluster, and then identifying and predicting mold breakout comprising the following steps:

first step of extracting sticking breakout feature vectors comprising:
 (1) acquiring historical temperature data of sticking breakout by marking the time when the temperature of a first row of thermocouples in a thermocouple column where a sticking position is located is the maximum, and selecting the temperature data within a first M seconds and a last N−1 seconds, M+N seconds in total; and
 (2) extracting and constructing temperature feature vectors of the first row and a second row of thermocouples;

second step of extracting normal condition feature vectors comprising:
 (1) acquiring historical temperature data under normal conditions by randomly intercepting temperature data at continuous M+N seconds; and
 (2) extracting and constructing temperature feature vectors of the first and second rows of thermocouples;

third step of extracting on-line real-time temperature feature vectors comprising:
 (1) collecting and acquiring temperature data of thermocouples of each row and each column on loosed wide face, fixed wide face, left narrow face, and right narrow face copperplates of a mold within the current time and previous M+N−1 seconds, M+N seconds in total in real time; and
 (2) extracting and constructing temperature feature vectors of the first and second rows of thermocouples;

fourth step of establishing a feature vector library comprising:
(1) establishing a feature vector sample library D based on the sticking breakout, normal condition and on-line actually measured temperature feature extracted in the first step, the second step and the third step; and
(2) performing normalization on the feature vector sample library D, to obtain a feature vector sets, and recording a normalized on-line actually measured temperature feature as $S_{new}$
the normalization method for the feature vector is as follows:

$$x\_nor_{ij} = \frac{x_{ij} - x_{jmin}}{x_{jmax} - x_{jmin}}, i = 1, 2, \ldots, |S|, j = 1, 2, \ldots, 5$$

where $x_{ij}$, represents the value of the j-dimensional feature of the ith feature vector in the feature vector set s, $x_{jmax}$ and $x_{jmin}$ respectively represent a maximum and a minimum of the j-dimensional feature of all feature vectors, and S represents the total number of vectors in the feature vector set s;

fifth step of performing hierarchical clustering on feature vectors comprising:
(1) performing hierarchical clustering on the feature vector sets obtained in the fourth step, the specific process including:
1.1) taking each vector sin the feature vector set S as an initial cluster $C_i=\{S_i\}$, and establishing a cluster set $C=\{C_1, C_2, \ldots, C_k\}$, where $s_i$, represents the ith vector in S, $C_i$, represents the ith cluster, i=1, 2, ..., k, k represents the total number of vectors in the feature vector set s
1.2) calculating and determining a distance between any two clusters $C_p$ and $C_q$ in the cluster set C:

$d(C_p, C_q) = \min(\text{dist}(C_{pi}, C_{qj}))$ where C, represents the ith feature vector in the cluster $C_p$, $C_{qj}$ represents the jth feature vector in the cluster Cq, and dist($C_{pi}$, $C_{qj}$) represents the Euclidean distance between the feature vectors $C_{pi}$ and $C_{qj}$; and calculating the distance between any two vectors in the clusters $C_p$ and $C_q$ and taking the minimum distance min as the distance between the clusters $C_p$ and $C_q$;
1.3) marking two clusters $C_m$ and $C_n$ between which the distance is the minimum calculated in the step 1.2, merging $C_m$ and $C_n$ into a new cluster $C_{\{m,n\}}$ and adding same to the set C, and deleting the original clusters $C_m$ and $C_n$, so after cluster addition and deletion, the total number of clusters in the set C is reduced by one at this time;
1.4) performing steps 1.2-1.3 in a loop, when there are only two clusters in the cluster set C, ending the loop, and completing the clustering process;
(2) checking whether the clustering result meets the following judgement condition, that is:
more than 90% of all sticking breakout feature vectors belong to the same cluster, and the percentage of the normal condition feature vectors in the cluster is less than 20%;
if this condition is met, recording this cluster as a breakout cluster $C_{breakout}$ and recording the other cluster as a normal condition cluster $C_{normal}$; otherwise, performing the fifth step again until the clustering result of the feature vector set composed of breakout, normal condition, and actually measured temperature feature meets the above judgement condition;
sixth step of identifying breakout and issuing alarm comprising:
judging whether the new feature vector $s_{new}$, belongs to the cluster $C_{breakout}$, if so, issuing a breakout alarm; otherwise, continuing to perform the third through sixth steps;
the temperature feature extraction methods involved in the first step (2), the second step (2) and the third step (2) being identical, extracting features of change in the temperature of the same column of thermocouples in a casting direction under different working conditions by using each column of thermocouples as a unit, specifically including:
1st_Rising_Amplitude: first row temperature rising amplitude;
1st_Rising_V_Max: first row temperature rising velocity maximum;
1st_Falling_V_Ave: first row temperature falling velocity average;
2nd_Rising_V_Max: second row temperature rising velocity maximum;
1st_2nd_Time_Lag: temperature rising time lag, that is, time interval between the time when the temperature of the second row of thermocouple starts to rise and the time when the temperature of the first row of thermocouple starts to rise;
and thus constructing a feature vector:
s=[1st_Rising_Amplitude, 1st_Rising_V_Max, 1st_Falling_V_Ave, 2nd_Rising_V_Max, 1st_2nd_Time_Lag].

2. The prediction method for mold breakout based on feature vectors and hierarchical clustering according to claim 1, wherein the prediction method for breakout is suitable for on-line prediction of breakout of slabs, billets, round billets and beam blanks during continuous casting.

* * * * *